H. B. GRAHAM.
VEHICLE.
APPLICATION FILED JAN. 12, 1916.
1,185,195.
Patented May 30, 1916.
2 SHEETS—SHEET 1.
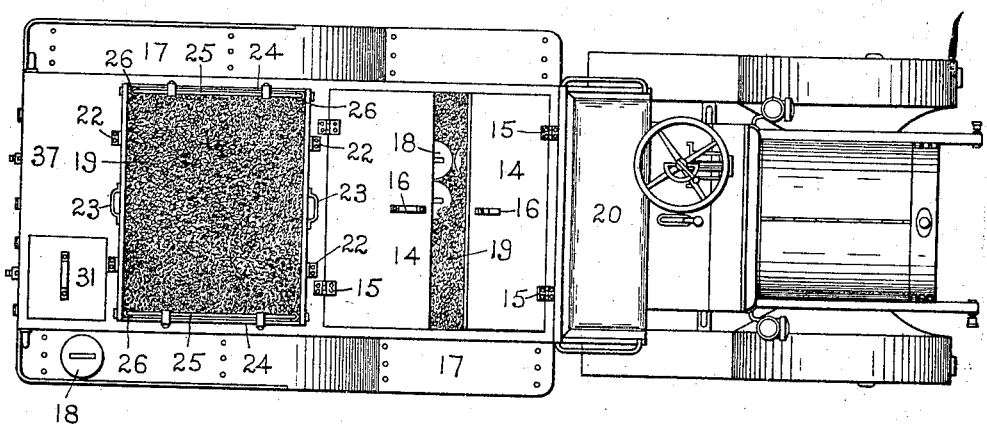
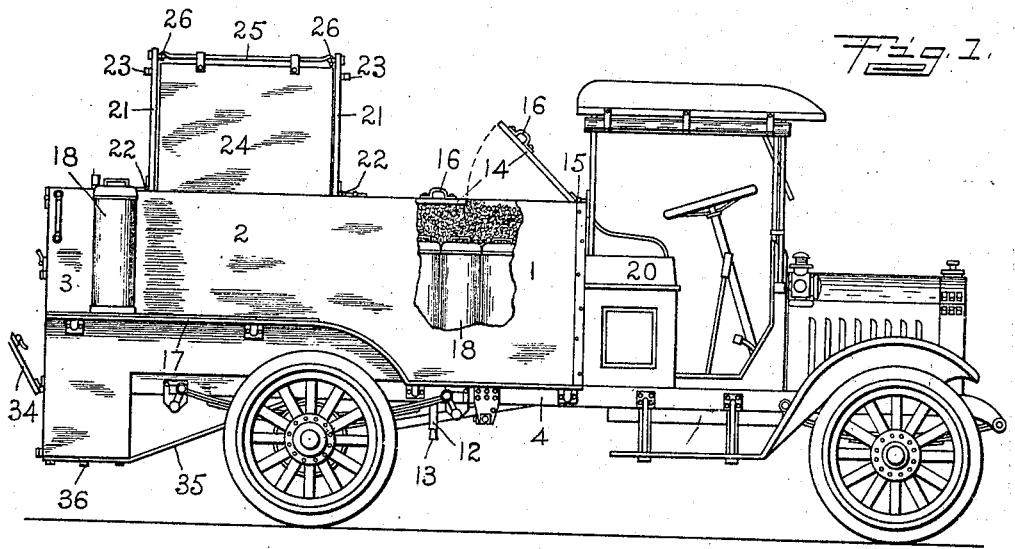

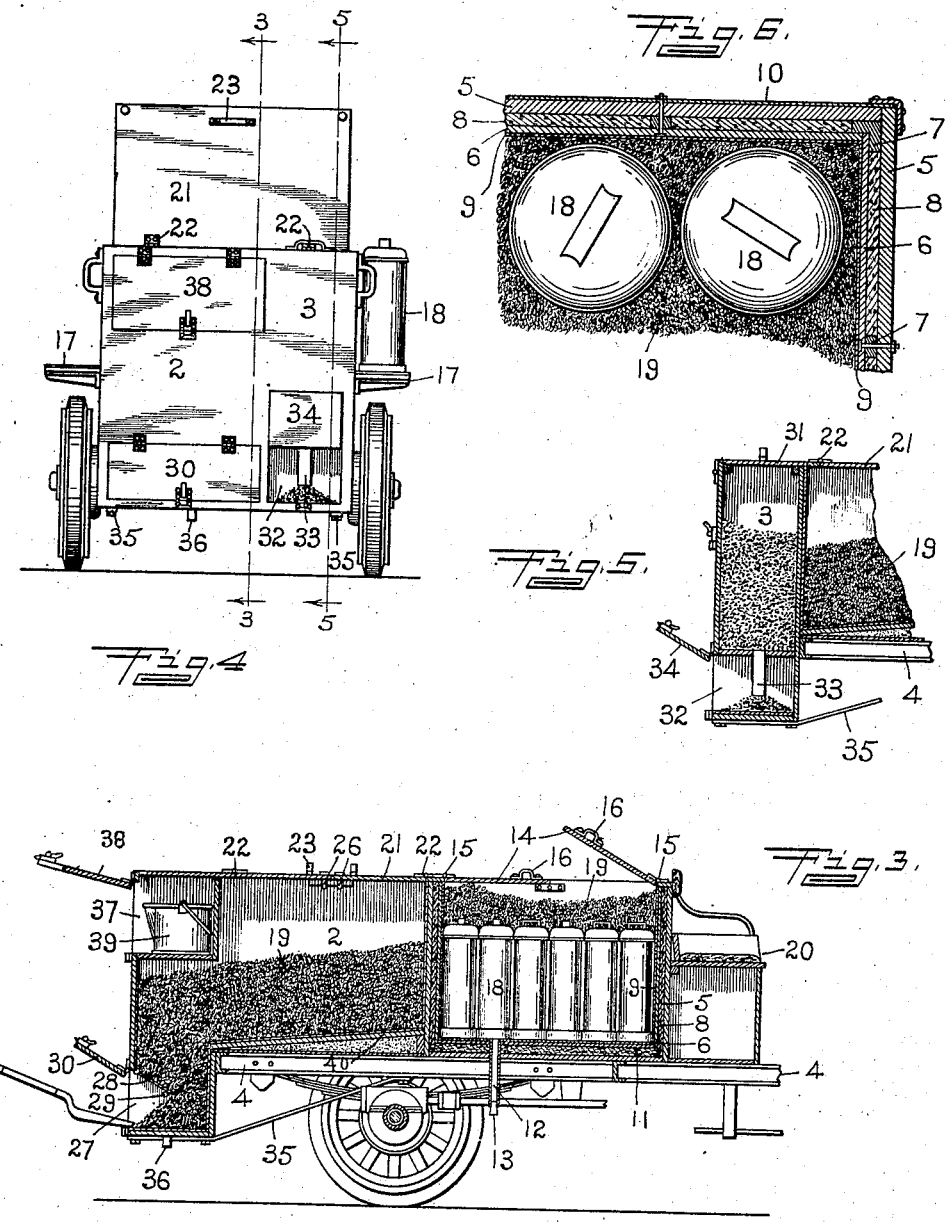

UNITED STATES PATENT OFFICE.

HOWARD B. GRAHAM, OF OMAHA, NEBRASKA.

VEHICLE.

1,185,195.

Specification of Letters Patent. Patented May 30, 1916.

Application filed January 12, 1916. Serial No. 71,658.

*To all whom it may concern:*

Be it known that I, HOWARD B. GRAHAM, a citizen of the United States, residing in the city of Omaha, in the county of Douglas and State of Nebraska, have invented certain new and useful Improvements in Vehicles and have described the same in the following specification, illustrated by the accompanying drawings.

My invention relates to that class of vehicles, commonly called ice-cream route wagons, which individually comprise, within a single wagon body, a number of separate compartments, as one compartment for ice, one compartment for salt, and one for cans of ice-cream packed in ice and salt; and which are commonly used in the transportation of ice-cream in cans from the factories where it is made, and in the wholesale delivery of the same, repacked in ice and salt, in the stores of dispensers and dealers, who may sell the same to ultimate consumers.

It is the object of the invention to provide, in such a vehicle, for the filling of the usual mixing pails on the ground behind the wagon, and to avoid filling them in crowded space on the wagon floor; thereby to prevent spilling on the floor of the vehicle any of the ice and salt intended for these pails; to avoid the usual need of climbing up into the wagon with these pails to be filled, and of climbing down out of the wagon with the pails when filled; to shape and arrange the several compartments in correlative positions economical of floor space; to facilitate and control the delivery of the salt and fresh ice from their respective compartments as needed; to cause the ice and salt for mixing to be delivered at conveniently positioned outlets to the attendant, or driver, standing on the ground; to deliver the ice and salt behind the vehicle at points below the level of the truck frame, or wagon gear, as the case may be; to discharge all drip directly upon the earth or pavement; to adapt the several compartments to form advantageously disposed parts of a unitary ice-cream vehicle; to discharge the drip from the ice compartment at a point behind the vehicle frame and near the ground; to prevent the vehicle and its compartments from being rotted or corroded by the drip; to effect these several results collectively and coöperatively; and in general to produce a superior vehicle of the specified class. To accomplish this object, I incorporate in my improved vehicle, as parts of the vehicle body, a number of separate compartments which are of special construction and which are mounted on a horizontal base frame of the vehicle in particular spacial relations to each other.

The accompanying drawings illustrate the best manner in which I have contemplated applying the principles of the invention; yet the latter is not restricted to any specific construction or arrangement of parts, excepting as limitations of this kind are either expressed in the subjoined claims or necessitated by the pre-existing state of the industrial art to which the invention relates.

In these drawings Figure 1 is a side elevation of an ice-cream vehicle which is constructed in accordance with these principles. In this view a part of the vehicle body is broken away, to exhibit its contents. Fig. 2 is a plan of the same vehicle without the canopy. Fig. 3 is a longitudinal vertical section of the middle and rearward parts of the same vehicle on the section line 3—3 of Fig. 4 and includes a disconnected scoop shovel. Fig. 4 is a rear elevation of the same vehicle. In Figs. 1, 2 and 4 an ice-cream can is shown standing on the runboard of the vehicle. Fig. 5 is a longitudinal section on the section line 5—5 in Fig. 4. Fig. 6 is a horizontal section of a corner portion of the ice-cream compartment and contents.

In the illustrated specimen of my invention, the ice-cream compartment 1, ice compartment 2 and salt compartment 3, are mounted on the base frame of a motor truck of ordinary construction. They are individually rectangular in horizontal section, and are collectively of uniform height and width, spanning the side beams 4 of said frame. The ice-cream compartment 1, which is watertight and thermically non-conductive, has its four vertical walls composed preferably of the outer wooden jacket 5, the inner boarding 6, which is spaced from the jacket 5 by the nailing-blocks 7, the intermediate cork slab 8, the inside lining of galvanized iron 9, and the outside covering of sheet metal 10. The flat bottom 11 of this compartment is similarly non-conductive and watertight, and is continuous with the side walls just described. It is perforated by the drip pipe 12, having the terminal drain cock 13 below the level of the base frame. The closure of this compartment at the top, consists of the two duplicate lids 14, resembling a folding trap door. These lids, being attached by the hinges 15 to the front and rear walls of the compartment respectively, are fitted nicely together across the middle of the compartment, from side to side of the vehicle, and are provided with the handles 16 within easy reach of the attendant standing on either side of the runboards 17 at the opposite sides of the vehicle. This compartment affords room for a convenient number of ice-cream cans 18 of ordinary construction, contained therein, and for a suitable quantity of broken ice 19, in and under which these cans are packed. It occupies the middle portion of the vehicle, next behind the driver's seat 20.

The ice compartment 2 is a rectangular box, immediately behind the described ice-cream compartment and contiguous thereto. Like the latter, it has a pair of folding lids 21, which are attached to the body of the box by the hinges 22, and are nicely fitted to shut down horizontally together across the top of the box, as in Fig. 3. These lids are provided with handles 23 within reach from the run-boards. This compartment has also a pair of removable side curtains of sheet metal 24, which are suspended from the lids 21 by means of the curtain rods 25 and the ring-bolts 26, as shown in Figs. 1, 2 and 4, whenever it is desired to carry on this compartment an unusually large supply of ice. At all other times, and whenever the ice compartment is to be closed, the curtains and curtain rods are to be detached and may be either removed or stored within the compartment. The same compartment has an insulated false bottom, or floor, 40, sloping downward and backward to the margin of the dependent intercommunicating delivery chamber 27, which hangs down in rectangular form below the level of that floor and behind the frame of the vehicle and has the drip pipe 36. The supply of broken ice, feeding down onto the floor of this delivery chamber from the body of the compartment above, is regulated and controlled by the hinged gate, or shelf, 28, which is adjusted to any desired angle across the entrance to this chamber by the movable stop pin 29; and this supply is made accessible for use by opening, as often as necessary, the rear door 30 into the bottom of this chamber.

In an upper and back corner of the ice compartment, and at a distance above the delivery chamber 27, there is formed by vertical and horizontal partitions the rectangular closet 37, which has an outside rear door 38 and is adapted to accommodate the mixing-pails 39 and other tools and appliances, when they are not in use. The salt chamber 3 is similarly formed and located in the opposite back corner of the ice compartment. It has the removable lid 31 flush with the top of the ice compartment and is provided with the separate delivery chamber 32, which hangs down in rectangular form below the bottom level of the body of the ice compartment and behind the base frame of the vehicle. It has the chute 33, leading from the body of the salt compartment into the lower part of this delivery chamber, and the outside back door 34 where the salt may be shoveled out as needed for use. Like the chamber 27, it has a shoe 35, which reaches upward and forward from the bottom of the chamber to one of the side beams 4, and serves as a brace to prevent the chamber from being knocked backward by collision with snow and other obstacles on the ground.

At the factory where the vehicle is loaded, the compartment 1 is supplied with a plurality of the filled ice-cream cans 18, packed in broken ice 19 as shown, and is closed by the lids 14; the delivery door 30 being latched shut as shown in Fig. 4, the body of the compartment 2 is then either filled with ice and closed by the lids 21, as shown in Fig. 3, or, while still open, is loaded with an additional quantity of ice piled into the quadranglar space surrounded by the open vertically standing lids 21 and the intermediate side curtains 24, as shown in Fig. 2; and the body of the compartment 3 is filled with crushed salt, and closed with the cap 31, as in Fig. 5, while the door of its delivery chamber 32 is latched shut as in Fig. 2. When the vehicle arrives at a point of delivery, the driver, standing on the run-board, takes one or more of the filled cans from the compartment 1 and for convenience stands the same on that board as shown. Then, standing on the ground behind the vehicle, he opens the doors of the delivery chambers 27 and 32 and the closet 37, takes out from these chambers with a scoop shovel so much ice and salt as he needs, mixes the same in a pail 39 taken from the closet, closes the doors of the chambers, picks up the pail and the last mentioned can or cans of ice-cream, and carries his load by hand to the cabinet or other receptacle in which the canned ice-cream is to be packed in mixed ice and salt in the store of the customer or other distributer at that point of delivery. During this operation he always finds accessible on the floors of the delivery chambers respectively, sufficient but not excessive quantities of salt and ice, which have been caused by the jarring of the vehicle in locomotion, or otherwise, to work down through the regulating chute 33 and over the free edge of the adjusted gate 28 respectively. The run-boards serve not only as fenders over the vehicle wheels, and as shelves for the occasional support of an ice-cream can as shown, but also as platforms on which the driver may stand at work on either side of the vehicle as occasion may require. In short the vehicle operatively accomplishes in all particulars the above specified object of the invention.

I claim—

1. A vehicle of the specified class, comprising a base frame, a thermically insulated watertight compartment thereon, forming part of the vehicle body, and having folding top lids and a drip pipe, an ice compartment forming part of the same body, and having folding lids and removable side curtains connecting the lids when open, a delivery chamber dependent from the rear end of the ice compartment, and communicating therewith, an adjustable gate for regulating the flow of ice from the ice compartment to the delivery chamber, a door opening from the bottom of the delivery chamber at the back of the vehicle, a salt compartment located in a back corner of the ice compartment, and having a top cover back of the lids of the ice compartment, a tool closet formed in a back upper corner of the ice compartment, and having an outside rear door, a salt-delivering chamber under the salt compartment and communicating therewith, a chute regulating the flow of salt from the salt compartment to the salt-delivering chamber, and a door opening from the salt-delivering chamber at the back of the vehicle.

2. A vehicle of the specified class, comprising a horizontal base frame, a vehicle body carried on the frame, an ice-cream compartment formed in the body, an ice compartment formed in the body and behind the ice-cream compartment, a delivery chamber dependent from the rear end of the ice compartment and communicating therewith, means for regulating the flow of ice from the ice compartment to the dependent delivery chamber, a salt compartment formed in a back corner of the ice compartment, a dependent salt-delivering chamber under the salt compartment, means for regulating the flow of salt from the salt compartment to the salt-delivering chamber, a tool closet formed in a back upper corner of the ice compartment, and doors opening at the back of the vehicle from each of the delivering chambers and from the closet respectively.

3. A vehicle of the specified class, comprising a base frame, a vehicle body carried on the frame, an ice-cream compartment and an ice compartment which are formed in the body, a salt compartment partitioned off in the ice compartment, delivery chambers formed in the rear end of the body back of the frame, rear doors opening from the delivery chambers respectively, and run boards carried on the sides of the vehicle.

4. A vehicle of the specified class, comprising a truck frame, an ice compartment mounted thereon, a pair of rectangular hinged lids opening upward at the top of the compartment, and a pair of removable curtains adapted to span the pair of lids when open.

5. A vehicle of the specified class, having an internally partitioned body comprising therein a separate ice-cream compartment, an ice compartment partitioned from the ice-cream compartment, a tool closet partitioned from the ice compartment, an ice-delivering chamber intercommunicating with the ice compartment, a salt compartment partitioned from the ice compartment, and a salt-delivering chamber partitioned from the ice compartment and communicating with the salt compartment.

Witness my signature at Omaha, Nebraska, January 4th, 1916.

HOWARD B. GRAHAM.

Witness:
R. R. RAINEY.